United States Patent [19]
Miller

[11] Patent Number: 5,871,830
[45] Date of Patent: Feb. 16, 1999

[54] NEEDLED ENCAPSULATED FIBROUS PRODUCT

[75] Inventor: William S. Miller, Newark, Ohio

[73] Assignee: Owens Corning Fiberglas Technology, Inc., Summit, Ill.

[21] Appl. No.: 608,888

[22] Filed: Feb. 29, 1996

Related U.S. Application Data

[63] Continuation-in-part of Ser. No. 310,183, Sep. 21, 1994.
[51] Int. Cl.⁶ .................................................... B32B 3/02
[52] U.S. Cl. ............................ 428/70; 428/58; 428/68; 428/77; 428/192; 428/193; 428/194; 156/72; 156/148; 156/204; 156/213; 156/216; 156/269
[58] Field of Search ................................. 156/204, 213, 156/216, 269, 72, 148; 428/58, 68, 70, 77, 69, 192, 3, 4; 442/59, 400, 401, 402

[56] References Cited

U.S. PATENT DOCUMENTS 5,755,900  5/1988  Weir et al. ............................ 156/62.2

*Primary Examiner*—Richard Weisberger
*Attorney, Agent, or Firm*—C. Michael Gegenheimer; Curtis B. Brueske

[57] ABSTRACT

A fibrous product is produced by providing a collection of fibrous material, and encapsulating the fibrous material by covering the fibrous material with a film to form an encapsulated blanket of the fibrous material. The encapsulated blanket is then needled to cause entanglement of the fibrous material, thereby producing a needled, encapsulated fibrous product.

20 Claims, 3 Drawing Sheets

NEEDLED ENCAPSULATED FIBROUS PRODUCT

RELATED APPLICATION

The present application is a Continuation-in-Part of commonly assigned, copending U.S. patent application Ser. No. 08/310,183 filed Sep. 21, 1994 (Alkire et al.), now allowed, and entitled PROCESSING METHODS AND PRODUCTS FOR IRREGULARLY SHAPED BICOMPONENT GLASS FIBERS.

TECHNICAL FIELD

This invention relates to the needling of fibrous products, in particular to needling of encapsulated fibrous blankets.

BACKGROUND ART

Conventional fibers are useful in a variety of applications including reinforcements, textiles, and acoustical and thermal insulation materials. The fibers can be formed from organic molten materials, such as polymers, and inorganic materials such as glass, rock, slag, and basalt. Continuous fibers are typically produced via stationary bushings for reinforcement and textile applications. Such fibers are typically coated with a size for protection against abrasion and for enhanced compatibility with resin matrices. The glass fibers are often further processed by combining them into continuous strands, yarns and rovings, or by chopping the glass fibers into preselected lengths defined by the end user. Where chopped, the resulting short, straight fiber segments may be mixed with other materials, wet processed into mats such as are used for shingles, or otherwise treated for use. While stationary bushings have significant operational lifetimes, their throughput is limited relative to rotary fiberizing techniques for producing glass fibers.

Short, straight fibers typical of conventional acoustical and thermal insulation materials are made by rotary fiberizing techniques and are interconnected by binders. In such techniques, molten material is delivered to an orificed centrifuge, commonly referred to as a spinner. Fibers produced by the spinner are drawn downward by a blower. Binder can optionally be sprayed onto the fibers as they are drawn downward. The fibers are then collected and formed into a continuous blanket. The blanket can then be cut into desired lengths called batts.

Fibrous material, in the form of blankets or a collection of fibers, may optionally be encapsulated with a film to form an encapsulated blanket. Typically, the film is wrapped around the fibrous material and sealed together at the edges so that the film completely covers the fibrous material. The film could also be supplied in the form of a bag and then placed over the fibrous material. Encapsulation is particularly desirable when the fibers are loosely entangled or unbonded with each other rather than bound into a sharply defined, compressible product by an organic binder. Encapsulating the fibers provides for easy handling of the loosely entangled fibers for further processing or for supplying the fibers to an end user.

Needlepunching or "needling" is commonly used in the textile industry and the needled fabrics are found in a wide range of products. Needling is accomplished by a needle loom which subjects the fabrics to a needling process in which needles are pushed through the fibers of the fabrics to further entangle the fibers. It is difficult to needle fibers because of their loose entanglement with each other and the difficulty of holding the fibers together as they are fed into a needle loom. To overcome this difficulty, the fibers are frequently subjected to precursor processing steps, such as, carding, blending with other fibers, or lubrication before being needled. Carding aligns the fibers in a generally parallel direction and entangles the fibers because of the curliness of the fibers, giving the fibrous blanket some rigidity or strength. The carding is typically accomplished by the action of opposing, rotating cylinders having thousands of metal teeth which can damage or break the fibers.

It would be desirable to produce a fibrous product having rigidity and stiffness, in which the method of producing the fibrous product does not subject the fibers to excessive damage. It would also be desirable to produce the fibrous product so that a large quantity of fibrous material can be processed and to reduce the costs of manufacturing by eliminating processing steps and reducing the environmental clean up costs.

DISCLOSURE OF THE INVENTION

There has now been invented an improved method of producing a fibrous product by collecting, encapsulating, and needling the fibrous material, thereby producing a fibrous product having rigidity and stiffness. The method eliminates unneeded and damaging precursor steps, such as carding, blending of other fibers, or adding lubricant. The method also reduces the environmental purification costs by containing dust and loose fibers in the encapsulating film.

The fibrous product is produced by providing a collection of fibrous material either as a continuous fibrous blanket or as a collection of loose fibers. The fibrous material is then encapsulated by covering the fibrous material with a film to form an encapsulated blanket of the fibrous material. The encapsulated blanket is then needled, typically by a needle loom, to cause entanglement of the fibrous material. The encapsulated blanket, having two major surfaces, can be needled on just one side or on both major sides. Preferably, the encapsulated blanket is compressed prior to needling for ease of directing the encapsulated blanket into the needle loom. The film, prior to being needled, can be attached to the fibrous material so that the fibrous material does not slide with respect to the encapsulating film.

In an alternate embodiment of the invention, the needling causes portions of the fiber to penetrate into the fibrous material, thereby bonding the film to the fibrous material. Preferably, the film is heated to cause the partial penetration. To facilitate the penetration of the film into the fibrous material, the air can be evacuated from the encapsulated blanket during the heating of the film.

In another embodiment of the invention the film is removed from the encapsulated blanket after the blanket has been needled, producing a needled fibrous product having rigidity but not containing any film material. This additional step utilizes the advantages of needling an encapsulated blanket but eliminates the film material in the final fibrous product for applications where the presence of the film is undesirable.

BEST MODE FOR CARRYING OUT THE INVENTION

Figure 1:
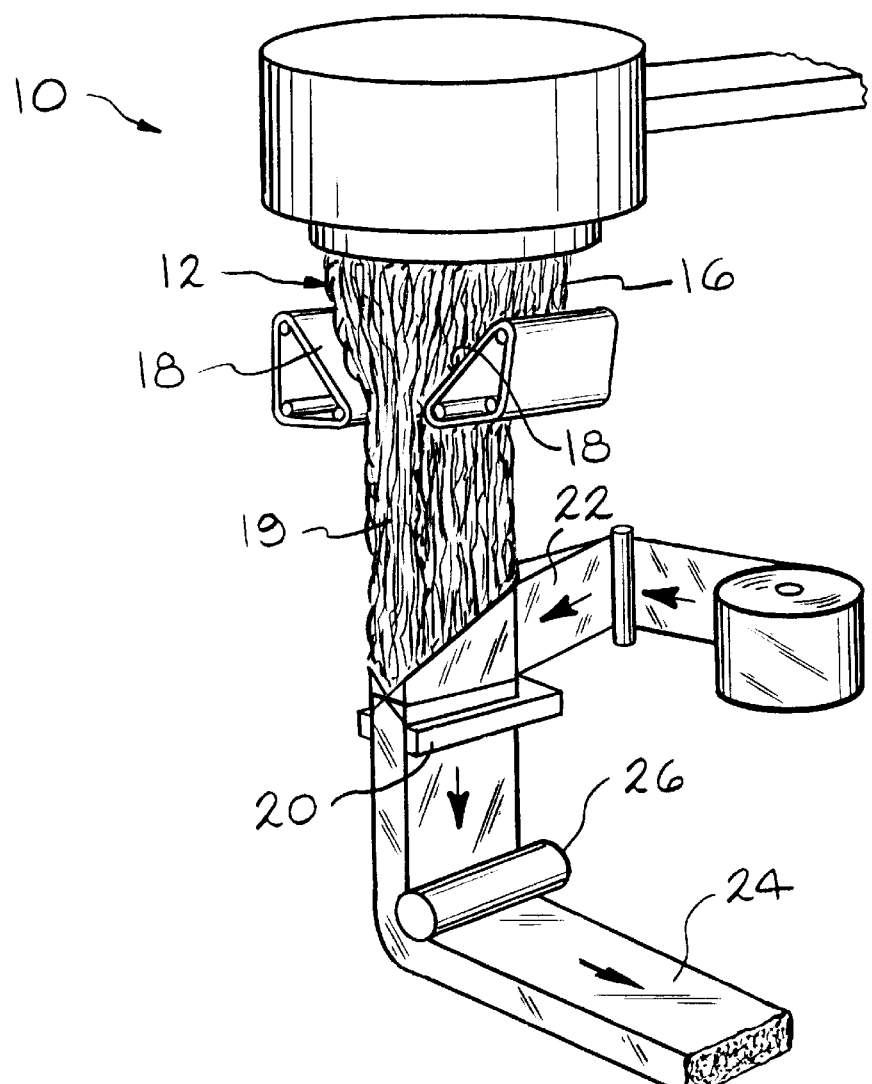
FIG. 1 is a schematic perspective view showing a method of forming, collecting, and encapsulating a fibrous blanket.

There is illustrated in FIG. 1 a rotary fiberizer apparatus, generally depicted by the numeral 10, which produces a fibrous product. The rotary fiberizer 10 includes a centrifuging spinner (not shown) that produces a continuous swirling veil 12 of moving gases and fibers 16. The invention is applicable to any molten fiberizable materials, both organic materials such as polymers, and inorganic materials such as glass, rock, slag, and basalt. The production of fibers and the creation of spirally moving veils is well known in the art. The veil 12 is captured on two opposed conveyor surfaces 18. The conveyor surfaces 18 are angled inwardly and downwardly to compress the downwardly moving veil 12 and convert it into a flattened cross-sectional shape. The gases are separated from the veil by any suitable manner, such as by exhausting the gases through the conveyor surfaces 18, which are foraminous. The collection of fibers forms a continuous blanket 19.

Although the fibers can be collected by any suitable means, the direct formed collection process as described above is preferred because it is better suited for collecting long fibers. Preferred fibers for use with the invention are irregular fibers, although straight fibers and curly or crimped fibers can also be used. Bi-component glass fibers or bi-component polymer fibers formed from the rotary fiberizer method have an inherent irregular shape. The irregular shape is formed when the two different types of molten material, having different rates of thermal expansion, are cooled and subjected to the swirling gases of the veil. The irregular shaped fibers have a more uniform weight distribution than straight fibers and an openness which gives the fibrous collection high loft, which is a desirable quality for insulation products.

The fibers are then passed to an encapsulation module 20 where the blanket is encapsulated with a film 22, forming an encapsulated blanket 24. Encapsulating a fibrous product is well known in the art. The film can be of any suitable material, such as, foil, paper, or plastic, and can be of any suitable form, such as a solid sheet, a porous mat or a porous nonwoven. The blanket can optionally be attached to the film by any suitable means, such as by an adhesive or by stitching. The attachment prevents the blanket from moving or sliding within the film, for example, when the encapsulated blanket is positioned vertically on a wall. The encapsulated blanket is then directed towards a packaging station (not shown) where the blanket can be rolled up or cut into individual units, called batts.

Figure 2:
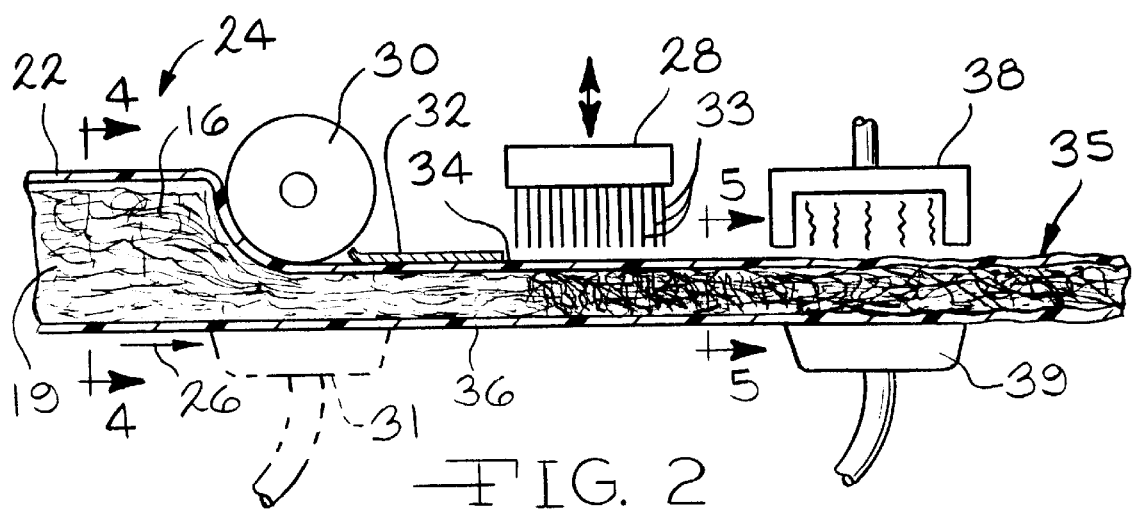
FIG. 2 is a partially sectioned schematic view of an encapsulated fibrous blanket being needled and then optionally heated, thereby producing the fibrous product of the present invention.

After encapsulation, the blanket is further processed by needling, which is a particular aspect of this invention. As shown in FIG. 2, the encapsulated blanket is moving in a direction 26 towards a needle loom 28. Preferably, the encapsulated blanket 24 is compressed before entering the needle loom since the encapsulated blanket is typically thicker than the working height of the needle loom. The compression can be performed by a roller 30 or by means of a vacuum, such as by a suction device, indicated by broken lines 31, which evacuates the air from the encapsulated blanket. A sled 32 is provided for maintaining the compression of the encapsulated blanket prior to entering the needle loom 28. The sled can be any suitable apparatus, such as a flat sheet or a conveyor, which maintains the compression of the encapsulated blanket.

The needle loom 28 subjects the fibers to a needling process in which numerous small diameter needles 33 are pushed through the film of the encapsulated blanket in a downward and upward motion. Typical needle looms have thousands of needles and operate between 1500 and 3000 strokes per minute. Needle loom technology is well known. The needles typically have one or more downwardly pointing barbs, or they can be forked at the tip. The barbs or forks capture and push individual fibers as the needles move on the downstroke, thereby entangling the individual fibers with adjacent fibers. As the needles move on the upstroke, the fibers slip off the barbs and remain entangled in the collection of fibers. The majority of the fibers before needling have a generally horizontal orientation. After needling, fibers are oriented both generally horizontally and generally vertically. This change in fiber orientation and the further entanglement gives the resulting needled blanket 35 rigidity and stiffness, which is a desired quality for various applications.

The needling process can be altered or adjusted in various ways to obtain different characteristics of the needled encapsulated blanket. For example, the needling can be done from just one major surface, such as upper surface 34 of the encapsulated blanket 24, or the needling can be done on both major sides, such as the upper surface 34 and lower surface 36 of the encapsulated blanket. Also, the choice of needles, the vertical displacement of the needles, repetitive needling, and the penetrations per square centimeter can all be varied to affect the characteristics of the needled encapsulated blanket.

Although the fibrous blanket 19 could be fed into the needle loom without encapsulation, the blanket is hard to handle and control through the needle loom since the blanket does not have a rigid form. Encapsulation confines the fibers so that the blanket can be easily handled and moved throughout various manufacturing lines. Also, the encapsulation allows for a large quantity of fibrous material to be needled or processed because a larger amount of fibers can be contained and compressed into the same area than would be contained in an unrestrained collection of fibers. Therefore, a high throughput of needled fibers can be processed economically. Another advantage of the encapsulation is that it greatly reduces the dust or loose fiber fly during the needling process, thereby reducing a potential irritant.

Figure 3:
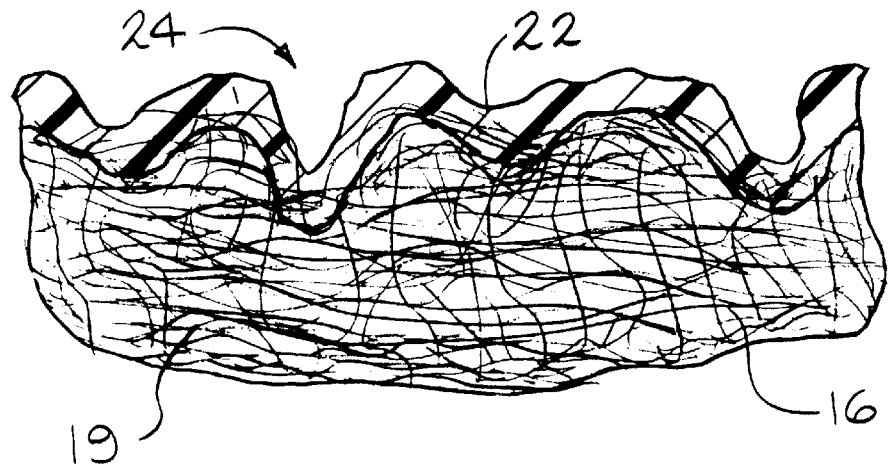
FIG. 3 is a partial sectional view of an encapsulated blanket in which the film has been partially penetrated into the fibrous material.

The encapsulated blanket can be optionally directed into a furnace 38, as shown in FIG. 2. The furnace heats the film causing the film to partially penetrate into the fibrous blanket 19, thereby bonding the film to the blanket. To facilitate penetration of the film into the fibrous blanket, the air from the encapsulated blanket can be evacuated by means of a suction device 39 during the heating of the film. FIG. 3 is a partial cross-section of the heated encapsulated blanket 24 showing the film 22 after it has partially penetrated into the fibrous blanket 19 so that the fibers 16 adjacent to the film are imbedded into the film. This bonding increases the rigidity of the fibrous product. The penetration can also be attained by other means, such as by subjecting the heated film to high velocity jets of air.

Figure 4:
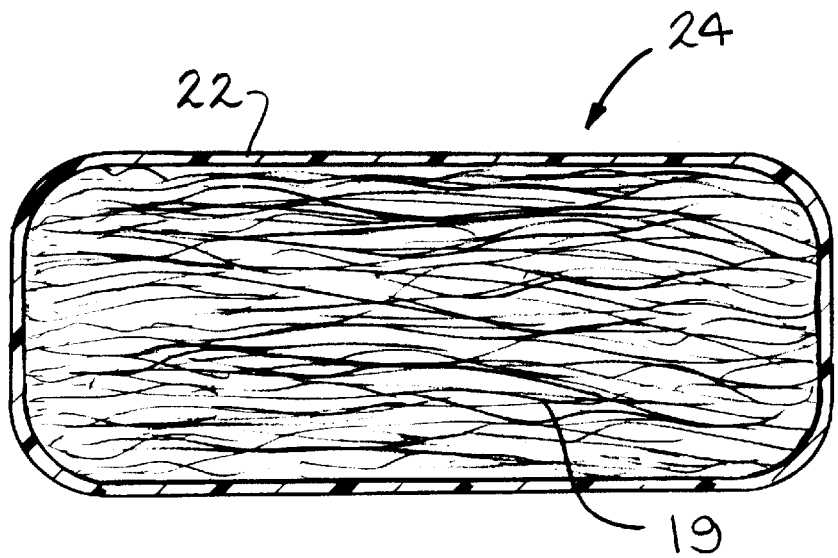
FIG. 4 is a cross-sectional view taken along lines 4—4 of FIG. 2, of an encapsulated fibrous blanket prior to needling.
Figure 5:
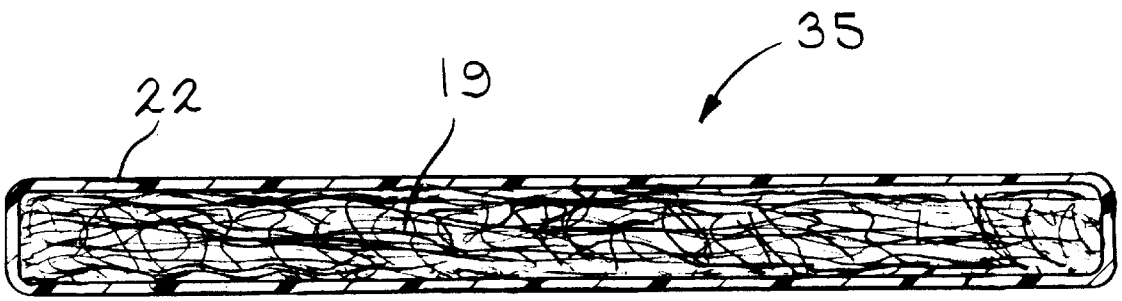
FIG. 5 is a cross-sectional view taken along lines 5—5 of FIG. 2, of the encapsulated fibrous blanket of FIG. 4 after being needled.

As can be seen from the cross-sectional views, FIGS. 4 and 5, the perimeter of the encapsulated blanket 24 before needling (FIG. 4) remains approximately equal to the perimeter of the encapsulated blanket 35 after needling (FIG. 5). The perimeters may be unequal because of the shrinking or stretching which can occur to the film 22 during needling. Since the height of the needled encapsulated blanket can be controlled by manipulating the characteristics of the needle loom, the desired width of the needled encapsulated blanket can be controlled by selecting the perimeter of the encapsulating film 22.

Figure 6:
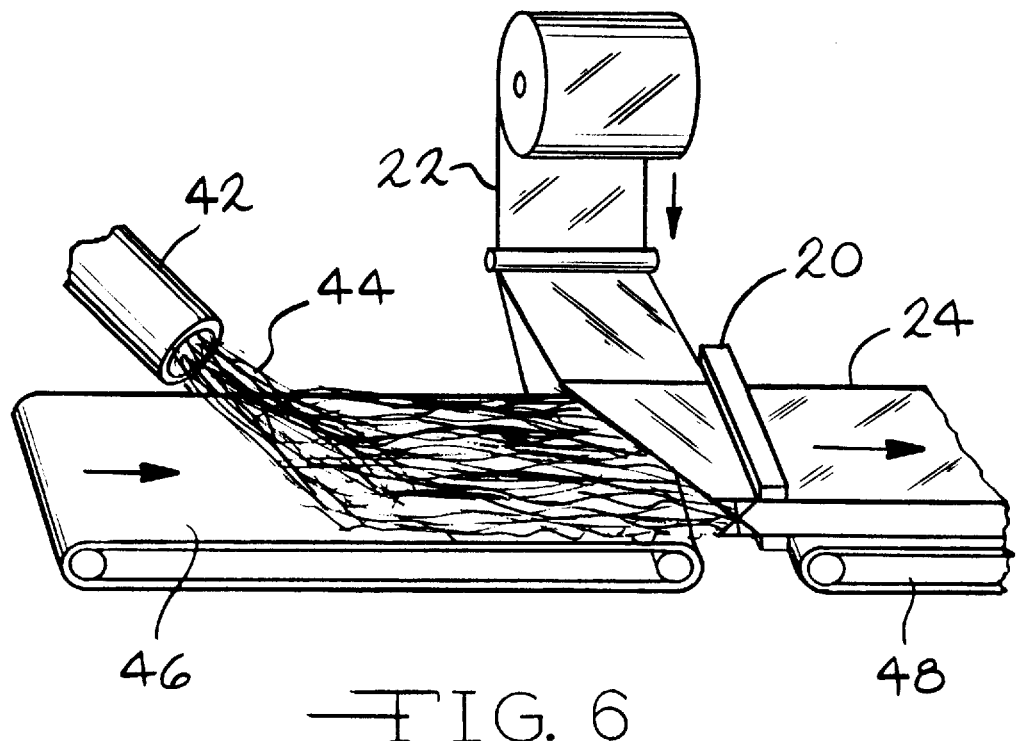
FIG. 6 is a schematic perspective view illustrating a loose collection of fibers being collected and encapsulated.

Although the invention has been described above as providing for needling of an encapsulated blanket of fibrous material, a collection of loose fibers can also be encapsulated and later needled. FIG. 6 schematically shows a chute 42 emitting a loose collection of fibers 44 onto a conveyor 46. The fibers can be any collection of fibers such as a collection comprised of crimped or cut fibers produced via bushings or produced by a rotary fiberizer. The fibers are then encapsulated by the encapsulation module 20 forming the encapsulated blanket 24. The encapsulated blanket is then directed away by conveyor 48 towards a packaging station (not shown) or directly to a needle loom (not shown).

Figure 7:
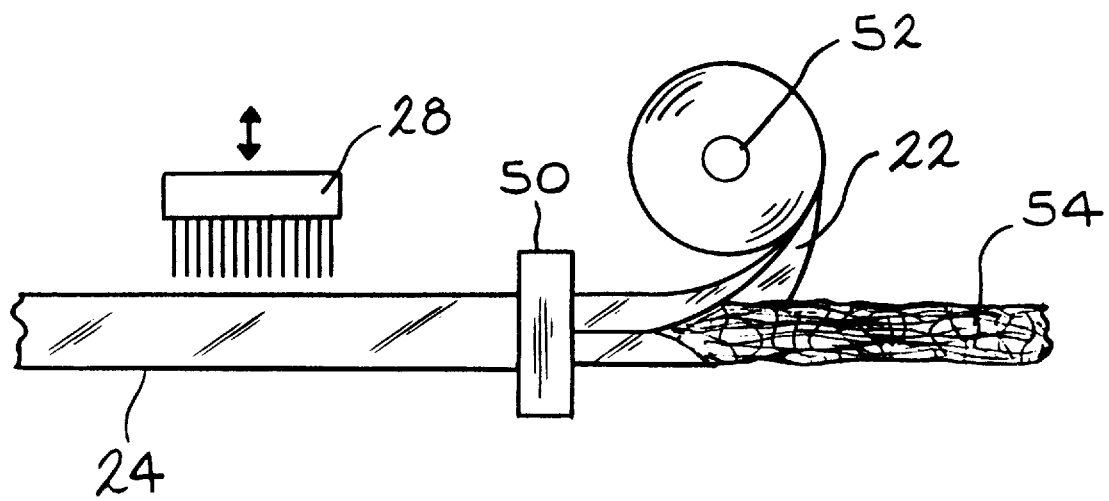
FIG. 7 is a schematic side elevational view illustrating an alternate embodiment of the invention in which the encapsulating film is removed after the encapsulated blanket has been needled.

FIG. 7 illustrates an alternate embodiment of the invention in which the film 22 is removed from the encapsulated blanket after the blanket has been needled, thereby forming a needled fibrous product. The encapsulated blanket 24 is needled by the needle loom 28 and then passes through a slitter 50 which cuts or slits the film 22. The removed film 22 is then rolled up on a take-up reel 52, leaving just needled fibers as the needled non-encapsulated fibrous product 54. The removed film can later be discarded. The needled non-encapsulated fibrous product is advantageous for applications that can not have a film layer, such as insulation for high temperature applications. The needled non-encapsulated fibrous product would, however, have increased rigidity compared to a non-needled non-encapsulated fibrous product.

It will be evident from the foregoing that various modifications can be made to this invention. Such, however, are considered as being within the scope of the invention.

INDUSTRIAL APPLICABILITY

The invention can be useful in the manufacturing of insulation and filtration fibrous products.

I claim:

1. A method for producing a fibrous product comprising:
   a. providing a collection of fibrous material;
   b. encapsulating the fibrous material by covering the fibrous material with a film to form an encapsulated blanket of the fibrous material; and
   c. needling the encapsulated blanket to cause entanglement of the fibrous material, thereby producing a fibrous product.

2. The method of claim 1 comprising attaching the film to the fibrous material.

3. The method of claim 1 comprising heating the film to cause the film to partially penetrate into the fibrous material, thereby bonding the film to the fibrous material.

4. The method of claim 3 comprising evacuating the air from the encapsulated blanket during the heating of the film, to facilitate penetration of the film into the fibrous material.

5. The method of claim 1 in which the encapsulated blanket is compressed prior to needling.

6. The method of claim 1 in which the step of needling is carried out in the absence of a preceding processing step selected from the group consisting of: carding, air laying, blending of other fibers, adding lubricant, and combinations thereof.

7. The method of claim 1 in which the encapsulated blanket has two major surfaces and in which the needling step is performed on both of the major surfaces.

8. The method of claim 1 further comprising removing the film from the encapsulated blanket after the blanket has been needled.

9. The method of claim 1 in which the step of providing a collection of fibrous material comprises supplying a continuous blanket.

10. The method of claim 9 comprising attaching the film to the continuous blanket.

11. The method of claim 9 comprising heating the film to cause the film to partially penetrate into the continuous blanket, thereby bonding the film to the continuous blanket.

12. The method of claim 9 in which the encapsulated blanket is compressed prior to needling by evacuating air from the encapsulated blanket.

13. The method of claim 9 in which the perimeter of the encapsulated blanket before needling is approximately equal to the perimeter of the encapsulated blanket after needling.

14. The method of claim 9 further comprising removing the film from the encapsulated blanket after the blanket has been needled.

15. A method for producing a fibrous product comprising:
   a. providing a collection of fibrous material;
   b. encapsulating the fibrous material by covering the fibrous material with a film to form an encapsulated blanket of the fibrous material;
   c. needling the encapsulated blanket to cause entanglement of the fibrous material, thereby producing a fibrous product; and
   d. penetrating the encapsulated blanket with the film so that the film partially penetrates into the fibrous material, thereby producing a fibrous product.

16. The method of claim 15 in which the step of penetrating comprises heating the film to cause the film to partially penetrate into the fibrous material, thereby bonding the film to the fibrous material.

17. The method of claim 16 comprising evacuating the air from the encapsulated blanket during the heating of the film, to facilitate penetration of the film into the fibrous material.

18. A fibrous product comprising:
   a. a collection of fibrous material; and
   b. a film which covers the fibrous material thereby forming an encapsulated blanket, the encapsulated blanket being needled to entangle the fibers.

19. The fibrous product of claim 18 in which the film is partially penetrated into the fibrous material.

20. The fibrous product of claim 18 in which the film is attached to the collection of fibrous material.

* * * * *